United States Patent
Wang

(10) Patent No.: US 10,679,415 B2
(45) Date of Patent: Jun. 9, 2020

(54) ENHANCED SIGNALING OF REGIONS OF INTEREST IN CONTAINER FILES AND VIDEO BITSTREAMS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/025,801

(22) Filed: Jul. 2, 2018

(65) Prior Publication Data

US 2019/0012839 A1    Jan. 10, 2019

Related U.S. Application Data

(60) Provisional application No. 62/528,926, filed on Jul. 5, 2017.

(51) Int. Cl.
*G06T 19/00* (2011.01)
*H04N 19/70* (2014.01)
(Continued)

(52) U.S. Cl.
CPC .......... *G06T 19/006* (2013.01); *G06T 19/003* (2013.01); *H04N 5/23238* (2013.01); *H04N 19/00* (2013.01); *H04N 19/70* (2014.11); *H04N 21/816* (2013.01); *H04N 21/85406* (2013.01); *G06T 2200/04* (2013.01); *G06T 2207/10021* (2013.01); *H04N 13/30* (2018.05); *H04N 19/167* (2014.11); *H04N 19/30* (2014.11); *H04N 19/597* (2014.11)

(58) Field of Classification Search
CPC combination set(s) only.
See application file for complete search history.

(56) References Cited

U.S. PATENT DOCUMENTS 10,580,167 B1 *    3/2020   Waggoner ................. G06T 9/20
2009/0164883 A1 *  6/2009   Decker ................. G06F 16/958
                                                          715/234
(Continued)

FOREIGN PATENT DOCUMENTS

WO    2017064689 A1    4/2017

OTHER PUBLICATIONS

International Search Report and Written Opinion—PCT/US2018/040748—ISA/EPO—dated Sep. 11, 2018.
(Continued)

*Primary Examiner* — Alexander Gee
(74) *Attorney, Agent, or Firm* — Polsinelli LLP

(57) ABSTRACT

Systems and methods are provided for specifying regional information such as a source and nature of a recommend viewport and a priority among multiple recommended viewports. Virtual reality video data can represent a 360-degree view of a virtual environment. In various examples, a region of the virtual reality video data can be determined, where the region includes a sub-section of the 360-degree view. A data structure can be generated for the region, where the data structure includes parameters that describe the region. The parameters can include a source associated with the region. The virtual reality video data and the data structure can be stored in a file.

24 Claims, 7 Drawing Sheets

(51) Int. Cl.

| | |
|---|---|
| *H04N 21/81* | (2011.01) |
| *H04N 21/854* | (2011.01) |
| *H04N 19/00* | (2014.01) |
| *H04N 5/232* | (2006.01) |
| *H04N 19/30* | (2014.01) |
| *H04N 19/597* | (2014.01) |
| *H04N 19/167* | (2014.01) |
| *H04N 13/30* | (2018.01) |

(56) References Cited

U.S. PATENT DOCUMENTS

| | | |
|---|---|---|
| 2010/0299630 A1 | 11/2010 | McCutchen et al. |
| 2015/0016504 A1 | 1/2015 | Auyeung et al. |
| 2016/0049007 A1* | 2/2016 | Mullins ................. G06T 19/006 345/419 |
| 2016/0155470 A1* | 6/2016 | Toma .................. G11B 20/1217 386/355 |
| 2016/0191893 A1 | 6/2016 | Gewickey et al. |
| 2016/0373771 A1 | 12/2016 | Hendry et al. |
| 2017/0336705 A1* | 11/2017 | Zhou ........................ G06T 15/10 |
| 2018/0061002 A1* | 3/2018 | Lee ....................... H04N 13/178 |
| 2018/0091735 A1* | 3/2018 | Wang ................... H04N 19/597 |
| 2018/0115806 A1* | 4/2018 | Hwang .............. H04N 21/2365 |

OTHER PUBLICATIONS

Wang Y-K., et al., "Viewport Dependent Processing in VR: Partial Video Decoding," 5. MPEG Meeting, May 30, 2016-Jun. 3, 2016, Geneva, (Motion Picture Expert Group or 150/IEC JTC1/5C29/WG11), No. m38559, May 25, 2016 (May 25, 2016), XP030066915, 7 pages.

* cited by examiner

ENHANCED SIGNALING OF REGIONS OF INTEREST IN CONTAINER FILES AND VIDEO BITSTREAMS

CROSS-REFERENCES TO RELATED APPLICATIONS

This applications claims priority to U.S. Provisional Application 62/528,926, filed on Jul. 5, 2017, which is incorporated by reference herein in its entirety.

FIELD

This application is related to the storage of virtual reality (VR) video contents in one or more media file formats, such as an ISO based media file format (ISOBMFF) and/or file formats derived from the ISOBMFF. For example, this application relates to methods and systems for signaling of the identification of VR video content, in some examples, including one or more VR video specific details, in a backwards compatible manner.

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its scalable video coding extension known as Scalable Video Coding (SVC) and its multiview video coding extension Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

BRIEF SUMMARY

Virtual reality (VR) describes a three-dimensional, computer-generated environment that can be interacted within a seemingly real or physical way. A virtual reality presentation can include video that encompasses 360 degrees of view. In various examples, a region of the available 360 degrees can be specified and indicated as having special meaning. For example, a content creator can define a region that the viewer should focus on (e.g., a "director's cut" of the video). As another example, a region can be indicated as being statistically the most often viewed.

In various implementations, provided are systems and methods for specifying regional information such as a source and nature of a recommend viewport and a priority among multiple recommended viewports. In various implementations, a method, including a computer-implemented method, an apparatus, and/or a non-transitory computer-readable medium can implement techniques for processing virtual reality video data. These techniques can include obtaining the virtual reality video data, where the virtual reality video data represents a 360-degree view of a virtual environment. The techniques can further include determining a region of the virtual reality video data, where the region includes a sub-section of the 360-degree view. The techniques can further include generating a data structure for the region, the data structure including parameters that describe the region, wherein the parameters include a parameter indicating a source associated with the region. The techniques can further include generating a file for storing the virtual reality video data. The techniques can further include storing the virtual reality video data in the file. The techniques can further include storing the data structure in the file.

In some aspects, the region can be used as a viewport when viewing the virtual reality video data.

In some aspects, the file is a container file, where the container file is organized according to a format, and where the data structure is stored in a box structure described by the format. In some aspects, a number of regions value in the box structure is allowed to be greater than one. In these aspects, when the virtual reality video data includes more than one region, parameters for the region and the more than one region can be stored in a same timed metadata track. In some aspect, a number of regions value in the box structure is constrained to one. In these aspects, when the virtual reality video data includes more than one region, parameters for the more than one region are stored in different timed metadata tracks.

In some aspects, the virtual reality video data is stored in the file as an encoded bitstream. In these aspects, the data structure is stored in a message element of the encoded bitstream.

In some aspects, the source associated with the region is a content creator. In some aspects, the source associated with the region indicates that the region is a most viewed region of the virtual reality video data.

BRIEF DESCRIPTION OF THE DRAWINGS

Illustrative embodiments of the present invention are described in detail below with reference to the following drawing figures.

DETAILED DESCRIPTION

Figure 1:
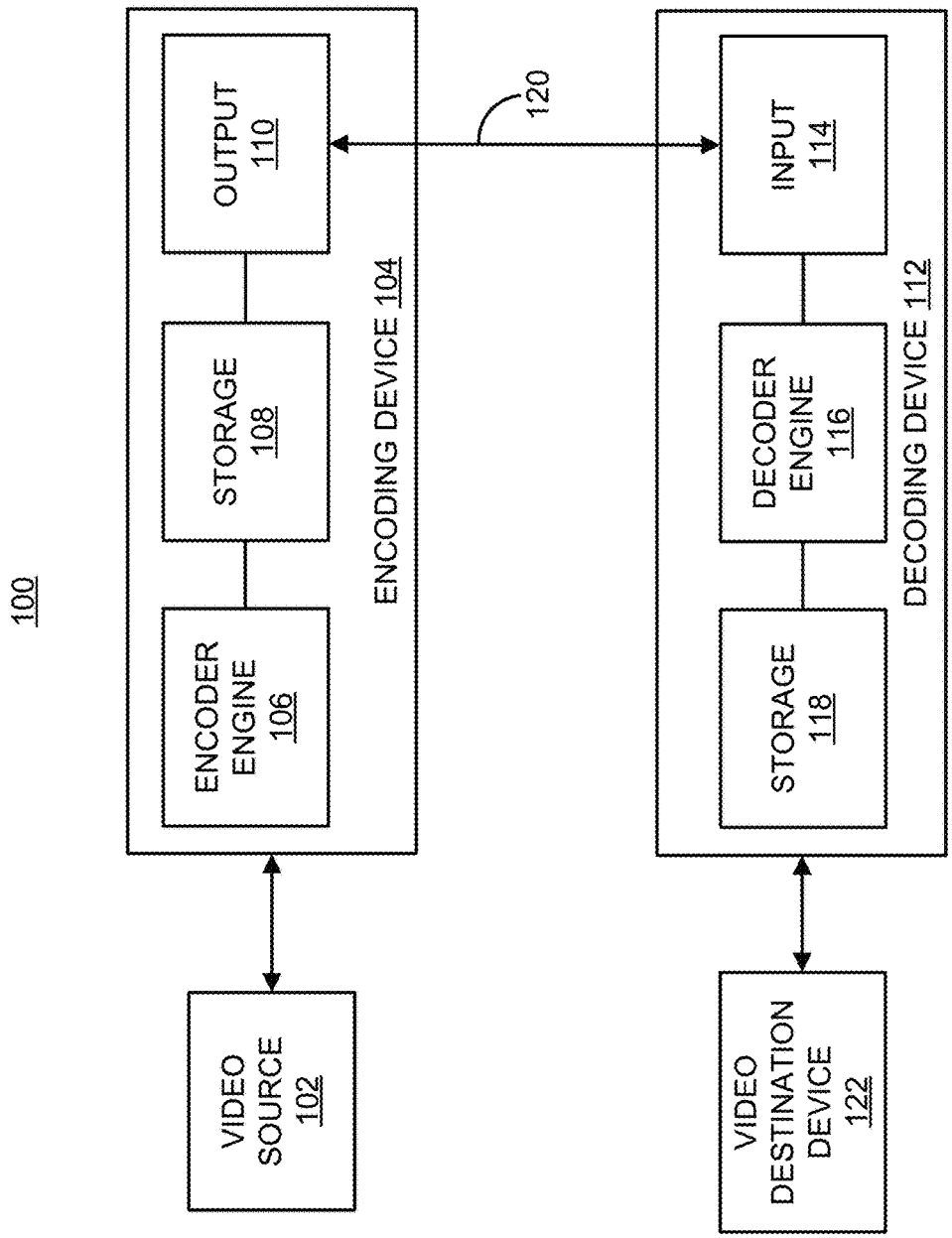
FIG. 1 is a block diagram illustrating an example of a system including an encoding device and a decoding device.

Certain aspects and implementations of this disclosure are provided below. Some of these aspects and implementations may be applied independently and some of them may be applied in combination as would be apparent to those of skill in the art. In the following description, for the purposes of explanation, specific details are set forth in order to provide a thorough understanding of implementations of the invention. However, it will be apparent that various implementations may be practiced without these specific details. The figures and description are not intended to be restrictive.

The ensuing description provides exemplary implementations only, and is not intended to limit the scope, applicability, or configuration of the disclosure. Rather, the ensuing description of the exemplary implementations will provide those skilled in the art with an enabling description for implementing an exemplary implementations. It should be understood that various changes may be made in the function and arrangement of elements without departing from the spirit and scope of the invention as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) describes a three-dimensional, computer-generated environment that can be interacted within a seemingly real or physical way. Generally, a user experiencing a virtual reality environment uses electronic equipment, such as a head-mounted display (HMD) and optionally also clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

File format standards can define the format for packing and unpacking video (and possibly also audio) data into one or more files, such as VR video or other types of video. File format standards include International Organization for Standardization (ISO) base media file format (ISOBMFF, defined in ISO/IEC 14496-12) and other file formats derived from the ISOBMFF, including Motion Pictures Experts Group (MPEG) MPEG-4 file format (defined in ISO/IEC 14496-15), 3rd Generation Partnership Project (3GPP) file format (defined in 3GPP TS 26.244), and file formats for the Advanced Video Coding (AVC) and High Efficiency Video Coding (HEVC) families of video codecs (both defined in ISO/IEC 14496-15). The draft texts of recent new editions for ISO/IEC 14496-12 and 14496-15 are available at http://phenix.int-evry.fr/mpeg/doc_end_user/documents/111_Geneva/wg11/w15177-v6-w15177.zip and http://wg11.sc29.org/doc_end_user/documents/115_Geneva/wg11/w16169-v2-w16169.zip, respectively.

The ISOBMFF is used as the basis for many codec encapsulation formats (e.g., the AVC file format or any other suitable codec encapsulation format), as well as for many multimedia container formats (e.g., the MPEG-4 file format, the 3GPP file format (3GP), the DVB file format, or any other suitable multimedia container format). ISOBMFF-based file formats can be used for continuous media, which is also referred to as streaming media.

In addition to continuous media (e.g., audio and video), static media (e.g., images) and metadata can be stored in a file conforming to ISOBMFF. Files structured according to the ISOBMFF may be used for many purposes, including local media file playback, progressive downloading of a remote file, as segments for Dynamic Adaptive Streaming over HTTP (DASH), as containers for content to be streamed (in which case the containers include packetization instructions), for recording of received real-time media streams, or other uses.

A box is the elementary syntax structure in the ISOBMFF. A box includes a four-character coded box type, the byte count of the box, and the payload. An ISOBMFF file includes a sequence of boxes, and boxes may contain other boxes. A Movie box ("moov") contains the metadata for the continuous media streams present in the file, each one represented in the file as a track. The metadata for a track is enclosed in a Track box ("trak"), while the media content of a track is either enclosed in a Media Data box ("mdat") or directly in a separate file. The media content for tracks includes a sequence of samples, such as audio or video access units.

The ISOBMFF specifies the following types of tracks: a media track, which contains an elementary media stream; a hint track, which either includes media transmission instructions or represents a received packet stream; and a timed metadata track, which comprises time-synchronized metadata.

Although originally designed for storage, the ISOBMFF has proven to be very valuable for streaming (e.g., for progressive download or DASH). For streaming purposes, the movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data, including virtual reality video data, using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable video coding and multiview video coding extensions, known as SVC and MVC, respectively. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Implementations described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 102 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by Intra prediction, and, therefore, is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with Intra prediction or inter-prediction. When the inter-prediction applies, the block is only predicted by one reference picture, and, therefore, reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

VCL NAL units include coded picture data forming the coded video bitstream. Various types of VCL NAL units are defined in the HEVC standard. In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (TRAP) pictures (also referred to as "random access pictures"). In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an IRAP picture at the base layer (the layer ID equal to 0), the AU is an IRAP AU.

A video bitstream encoded as discussed above can be written or packed into one or more files in order to transfer the bitstream from the encoding device 104 to the decoding device 112. For example, the output 110 may include a file writing engine, configured to generate one or more files that contain the bitstream. The output 110 can transmit the one or more files over the communications link 120 to the decoder device 112. Alternatively or additionally, the one or more files can be stored on a storage medium (e.g., a tape, a magnetic disk, or a hard drive, or some other medium) for later transmission to the decoding device 112.

The decoder device 112 can include, for example in the input 114, a file parsing engine. The file parsing engine can read files received over the communications link 120 or from a storage medium. The file parsing engine can further extract samples from the file, and reconstruct the bitstream for decoding by the decoder engine 116. In some cases, the reconstructed bitstream can be the same as the bitstream generated by the encoder engine 106. In some cases, the encoder engine 106 may have generated the bitstream with several possible options for decoding the bitstream, in which case the reconstructed bitstream may include only one or fewer than all the possible options.

A video bitstream encoded as discussed above can be written or packed into one or more files using the ISOBMFF, a file format derived from the ISOBMFF, some other file format, and/or a combination of file formats including the ISOBMFF. The file or files can be played back using a video player device, can be transmitted and then displayed, and/or be stored.

Figure 2:
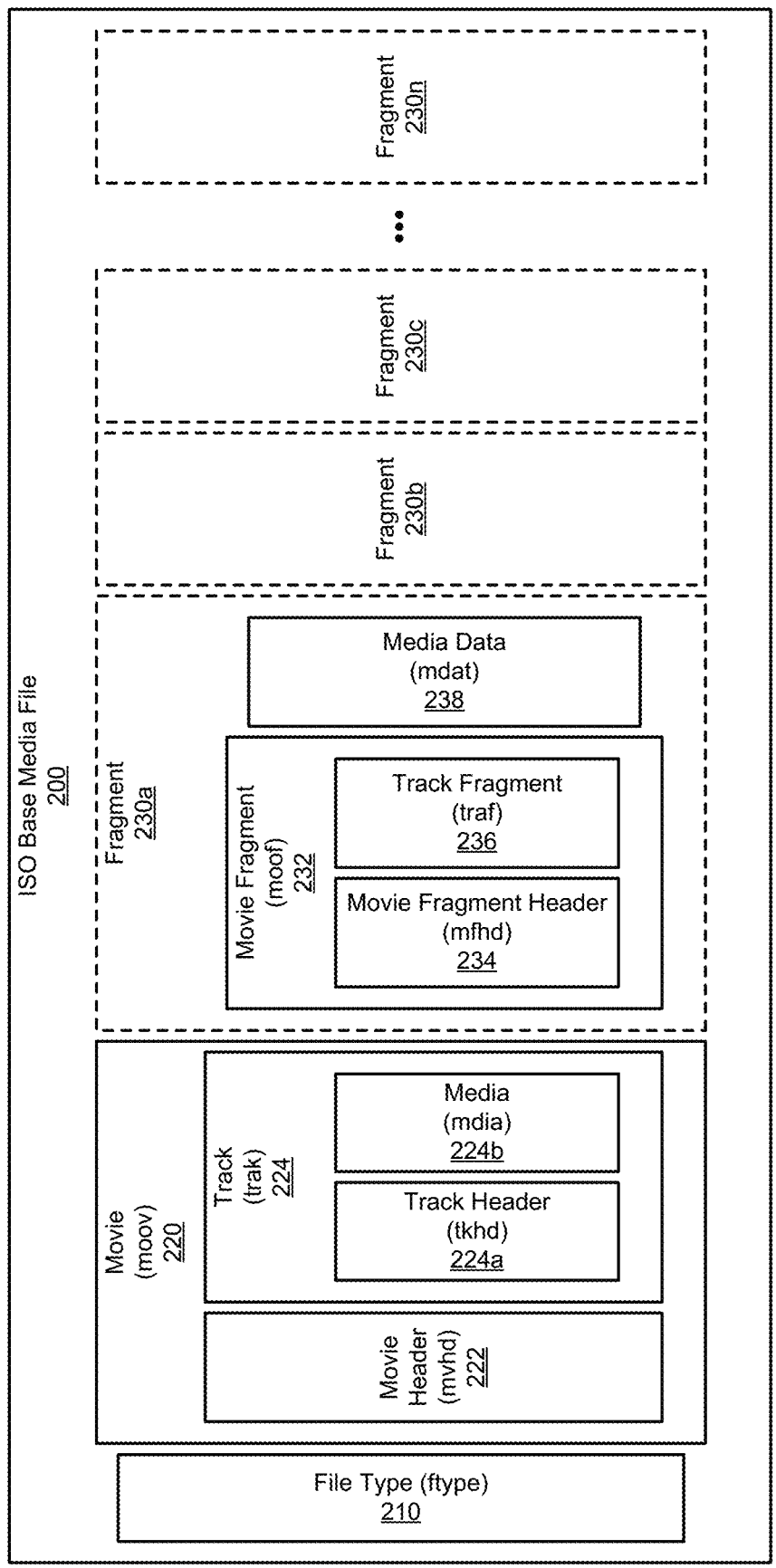
FIG. 2 illustrates an example of an ISO base media file that contains data and metadata for a video presentation.

FIG. 2 illustrates an example of an ISO base media file 200 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 2, at the top level of the file, an ISO base media file 200 can include a file type box 210, a movie box 220, and one or more movie fragment boxes 230a, 230n. Other boxes that can be included at this level but that are not represented in this example include free space boxes, metadata boxes, and media data boxes, among others.

An ISO base media file can include a file type box 210, identified by the box type "ftyp." The file type box 210 identifies an ISOBMFF specification that is the most suitable for parsing the file. "Most" in this instance means that the ISO base media file 200 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 210 can also include a version number, which can be used to indicate a version of the ISOBMFF specification. The file type box 210 can also include a list of compatible brands, which includes a list of others brands with which the file is compatible. An ISO base media file can be compatible with more than one major brand.

When an ISO base media file 200 includes a file type box 210, there is only one file type box. An ISO base media file 200 may omit the file type box 210 in order to be compatible with older player devices. When an ISO base media file 200 does not include a file type box 210, a player device can assume a default major brand (e.g. "mp41"), minor version (e.g., "0"), and compatible brand (e.g., "mp41"). The file type box 210 is typically placed as early as possible in the ISO base media file 200.

An ISO base media file can further include a movie box 220, which contains the metadata for the presentation. The movie box 220 is identified by the box type "moov." ISO/IEC 14496-12 provides that a presentation, whether contained in one file or multiple files, can include only one movie box 220. Frequently, the movie box 220 is near the beginning of an ISO base media file. The movie box 220 includes a movie header box 222, and can include one or more track boxes 224 as well as other boxes.

The movie header box 222, identified by the box type "mvhd," can include information that is media-independent and relevant to the presentation as a whole. For example, the movie header box 222 can include information such as a creation time, a modification time, a timescale, and/or a duration for the presentation, among other things. The movie header box 222 can also include an identifier that identifies the next track in the presentation. For example, the identifier can point to the track box 224 contained by the movie box 220 in the illustrated example.

The track box 224, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 224 includes a track header box 224a and a media box 224b. A track box can include other boxes, such as a track reference box, a track group box, an edit box, a user data box, a meta box, and others.

The track header box 224a, identified by the box type "tkhd," can specify the characteristics of a track contained in the track box 224. For example, the track header box 224a can include a creation time, modification time, duration, track identifier, layer identifier, group identifier, volume, width, and/or height of the track, among other things. For a media track, the track header box 224a can further identify whether the track is enabled, whether the track should be played as part of the presentation, or whether the track can be used to preview the presentation, among other things. Presentation of a track is generally assumed to be at the beginning of a presentation. The track box 224 can include an edit list box, not illustrated here, that can include an explicit timeline map. The timeline map can specify, among other things, an offset time for the track, where the offset indicates a start time, after the beginning of the presentation, for the track.

In the illustrated example, the track box 224 also includes a media box 224b, identified by the box type "mdia." The media box 224b can contain the objects and information about the media data in the track. For example, the media box 224b can contain a handler reference box, which can identify the media type of the track and the process by which the media in the track is presented. As another example, the media box 224b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, the media box 224b can also include a media header box.

In the illustrated example, the example ISO base media file 200 also includes multiple fragments 230a, 230b, 230c, 230n of the presentation. The fragments 230a, 230b, 203c, 230n are not ISOBMFF boxes, but rather describe a movie fragment box 232 and the media data box 238 that is referenced by the movie fragment box 232. The movie fragment box 232 and media data boxes 238 are top-level boxes, but are grouped here to indicate the relationship between a movie fragment box 232 and a media data box 238.

A movie fragment box 232, identified by the box type "moof," can extend a presentation by including additional information that would otherwise be stored in the movie box 220. Using movie fragment boxes 232, a presentation can be built incrementally. A movie fragment box 232 can include a movie fragment header box 234 and a track fragment box 236, as well as other boxes not illustrated here.

The movie fragment header box 234, identified by the box type "mfhd," can include a sequence number. A player device can use the sequence number to verify that the fragment 230a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 232 can also include one or more track fragment boxes 236, identified by the box type "traf." A movie fragment box 232 can include a set of track fragments, zero or more per track. The track fragments can contain zero or more track runs, each of which describes a contiguous run of samples for a track. Track fragments can be used to add empty time to a track, in addition to adding samples to the track.

The media data box 238, identified by the box type "mdat," contains media data. In video tracks, the media data box 238 would contain video frames. A media data box can alternatively or additionally include audio data. A presentation can include zero or more media data boxes, contained in one or more individual files. The media data is described by metadata. In the illustrated example, the media data in the media data box 238 can be described by metadata included in the track fragment box 236. In other examples, the media data in a media data box can be described by metadata in the movie box 220. The metadata can refer to a particular media data by an absolute offset within the file 200, such that a media data header and/or free space within the media data box 238 can be skipped.

Other fragments 230b, 230c, 230n in the ISO base media file 200 can contain boxes similar to those illustrated for the first fragment 230a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

The ISOBMFF specification specifies six types of Stream Access Points (SAPs) for use with DASH. The first two SAP types (types 1 and 2) correspond to instantaneous decoding refresh (IDR) pictures in H.264/AVC and HEVC. For example, an IDR picture is an intra-picture (I-picture) that completely refreshes or reinitializes the decoding process at the decoder and starts a new coded video sequence. In some examples, an IDR picture and any picture following the IDR picture in decoding order cannot be dependent on any picture that comes before the IDR picture in decoding order.

The third SAP type (type 3) corresponds to open-GOP (Group of Pictures) random access points, hence broken link access (BLA) or clean random access (CRA) pictures in HEVC. For example, a CRA picture is also an I-picture. A CRA picture may not refresh the decoder and may not begin a new CVS, allowing leading pictures of the CRA picture to depend on pictures that come before the CRA picture in decoding order. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In some embodiments, in the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

The fourth SAP type (type 4) corresponds to gradual decoding refresh (GDR) random access points.

The ISOBMFF, while flexible and extensible and widely used to store and transmit various types of media, does not include mechanisms for storing virtual reality video or identifying the contents of an ISO base media file as including virtual reality content. Player devices may thus not be able to determine that the contents of a file include virtual reality video. Player devices that are not capable of displaying virtual reality content may attempt to display the content anyway, resulting in a distorted presentation.

Virtual reality (VR) is the ability to be virtually present in a non-physical world that is created by the rendering of natural and/or synthetic image(s) and sound and correlated by the movements of the immersed user allowing the user to interact with that non-physical world. With the recent progress made in rendering devices, such as head mounted displays (HMD), and VR video (often also referred to as 360-degree video) creation, a significant quality of experience can be offered. VR applications include gaming, training, education, sports video, online shopping, adult entrainment, and so on.

A virtual reality system can include a video capture device and a video display device, and possibly also other intermediate devices such as servers, data storage, and data transmission equipment. A video capture device may include a camera set, that is, a set of multiple cameras, each pointed or oriented in a different direction and capturing a different view. The cameras of the camera set can ideally collectively cover all viewpoints around the camera set. For example, six cameras may be used to capture a full 360-degree view centered on the camera set's location. Some video capture devices may use fewer cameras, such as for example, video capture devices that capture primarily side-to-side views.

To provide a seamless 360-degree view, the video captured by each of the cameras in the camera set typically undergoes image stitching, where video pictures taken by the multiple individual cameras are synchronized in the time domain and stitched in the space domain, to be a spherical video, but mapped to a rectangular format, such as equirectangular (e.g., like a world map), a cube map, or other map. In some cases, image stitching in the case of 360-degree video generation can involve combining or merging video frames from adjacent cameras in the area where the video frames overlap or would otherwise connect. The result would be an approximately spherical frame, but similar to a Mercator projection, the merged data can be represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes can be used to represent a spherical environment.

Virtual reality video frames, mapped to a planar representation, can be encoded (or compressed) for storage and/or transmission. Encoding and/or compression can be accomplished using a video codec (e.g., a H.265/HEVC compliant codec, a H.264/AVC compliant codec, or other suitable codec) and results in a compressed video bitstream or group of bitstreams. Encoding of video data using a video codec is described in further detail herein.

The encoded video bitstream(s) can be stored and/or encapsulated in a media format or file format. The stored bitstream(s) can be transmitted, for example, over a network, to a receiver device that can decode and render the video for display. Such a receiver device may be a video display device, a player device, a decoder device, or other suitable device. For example, a virtual reality system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. The receiver device can support the media or file format that was used to pack the video bitstream into a file (or files), extract the video (and possibly also audio) data, to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device). Rendering devices include, for example, head-mounted displays (HMDs), virtual reality televisions, and/or other 180-degree or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

The Omnidirectional Media Application Format (OMAF), which was developed by MPEG, defines a media application format that enables omnidirectional media applications, such as virtual reality applications with 360-degree video and associated audio. Among other things, OMAF specifies a list of projection methods that can be used for conversion of a spherical or 360-degree video into a two-dimensional rectangular video, as well as descriptions for how to store omnidirectional media and the associated metadata using the ISO base media file format (ISOBMFF). Additionally, OMAF specified how to encapsulate, signal (e.g., flag or indicate), and stream omnidirectional media using dynamic adaptive streaming over HTTP (DASH). OMAF also specifies video and audio codecs and media coding configurations that can be used for compression and playback of the omnidirectional media signal.

It is proposed for OMAF to be adopted as ISO/IEC 23090-2, and a draft specification is available at: http://wg11.sc29.org/doc_end_user/documents/119_Torino/wg11/m40849-v1-m40849_OMAF_text_Berlin_output.zip.

The OMAF specification describes a format for signaling regional metadata, however, the specification for container files may be deficient in providing a description for signaling regional data.

The OMAF specification includes specification of regional metadata signaling in clause 7.4. Signaling, in this context, refers to the indication of information in a structured set of data, such as encoded bitstream or a file constructed according to a format. For example, clause 7.4, as illustrated be the examples that follow, describes a data structure that can be used to indicate information about regions of a 360-degree video. These regions are also referred to herein as sphere regions, and can represent less that the entire 360 degrees of video data. Clause 7.4 provides specifications for things such as signaling of sphere regions using timed metadata tracks, including recommended viewport timed metadata. The recommended viewport timed metadata track can indicate the viewport that should be displayed when the user does not have control of the viewing orientation or has released control of the viewing orientation. For example, the recommended viewport timed metadata track can be used to express the director's cut.

In clause 7.4.2 of the OMAF specification, the sample entry definition, syntax, and semantics of the sphere region timed metadata track are specified as follows:

Exactly one SphereRegionConfigBox shall be present in the sample entry. SphereRegionConfigBox specifies the shape of the sphere region specified by the samples. When the horizontal and vertical ranges of the sphere region in the samples do not change, they can be indicated in the sample entry.

Figure 3:
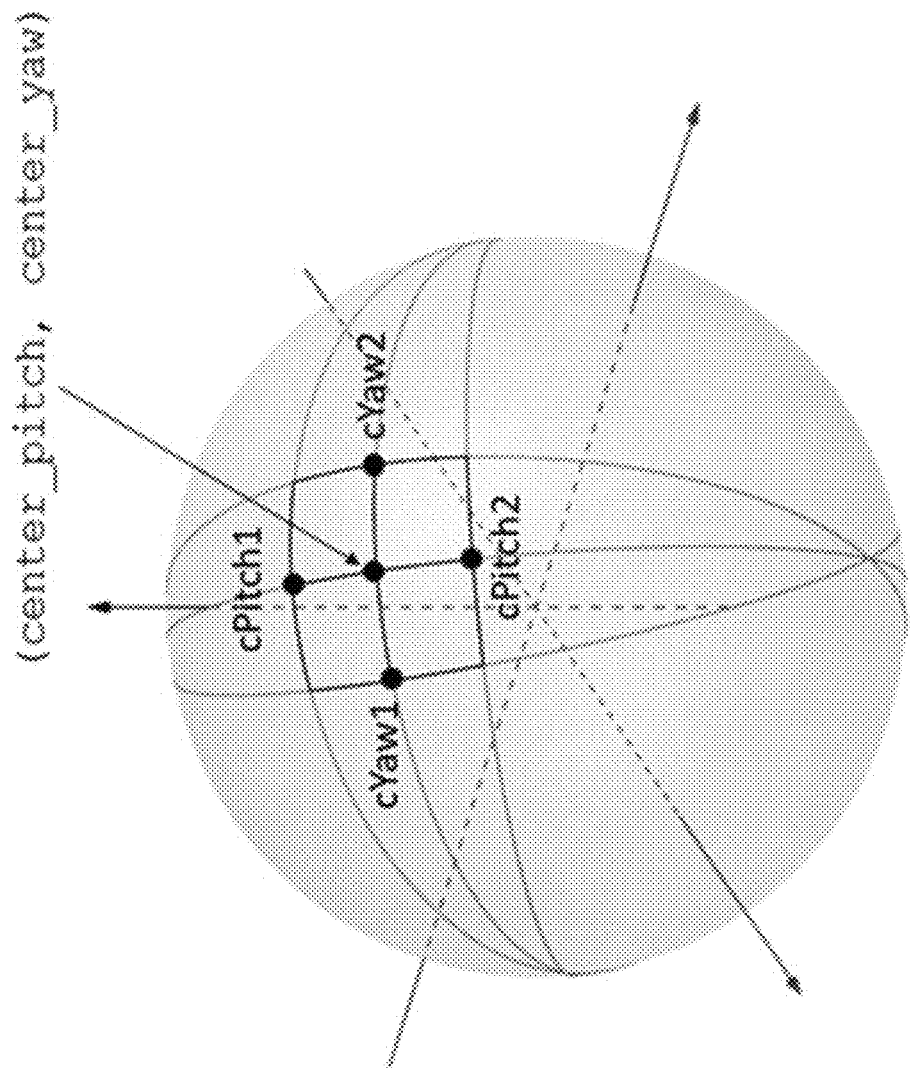
FIG. 3 includes a three-dimensional illustration of a 360-degree video frame, and a sphere region of the 360-degree video frame specified by four great circles.
Figure 4:
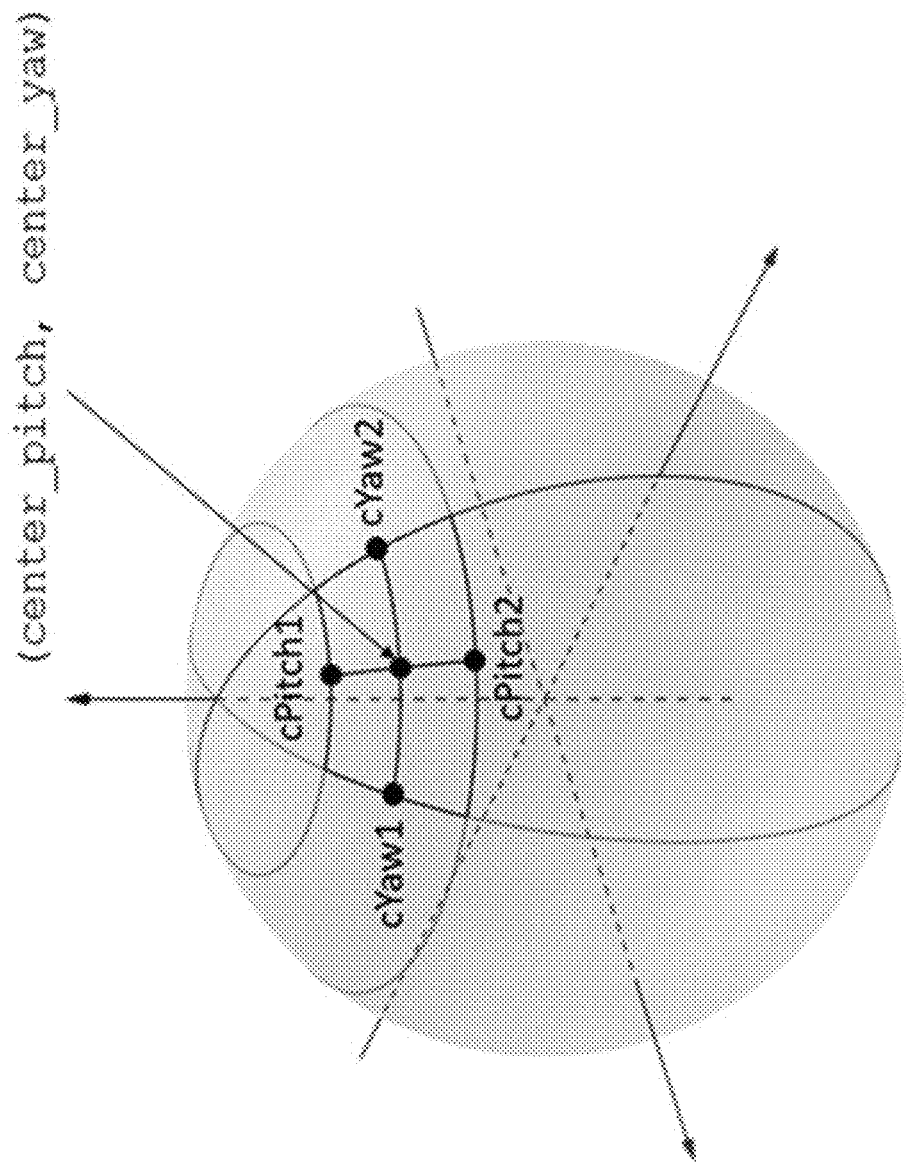
FIG. 4 includes a three-dimensional illustration of a 360-degree video frame, and a sphere region of the 360-degree video frame specified by two yaw circles and two pitch circles.

```
class SphereRegionSampleEntry(type) extends
MetaDataSampleEntry(type) {
        SphereRegionConfigBox( ); // mandatory
        Box[ ] other_boxes; // optional
}
class SphereRegionConfigBox extends FullBox('rosc', version = 0,
flags) {
        unsigned int(8) shape_type;
        bit(7) reserved = 0;
        unsigned int (1) dynamic_range_flag;
        if (dynamic_range_flag == 0) {
           unsigned int(32) static_hor_range;
           unsigned int(32) static_ver_range;
        }
        unsigned int(8) num_regions;
}
``` shape_type equal to 0 specifies that the sphere region is specified by four great circles as illustrated in FIG. 3 (a sphere region specified by four great circles).

shape_type equal to 1 specifies that the sphere region is specified by two yaw circles and two pitch circles as illustrated in FIG. 4 (a sphere region specified by two yaw circles and two pitch circles).

shape_type values greater than 1 are reserved.

dynamic_range_flag equal to 0 specifies that the horizontal and vertical ranges of the sphere region remain unchanged in all samples referring to this sample entry. dynamic_range_flag equal to 1 specifies that the horizontal and vertical ranges of the sphere region are indicated in the sample format.

static_hor_range and static_ver_range specify the horizontal and vertical ranges, respectively, of the sphere region for each sample referring to this sample entry in units of $2^{-16}$ degrees. static_hor_range and static_ver_rnge specify the ranges through the center point of the sphere region, as illustrated by FIG. 3 or FIG. 4. static_hor_range shall be in the range of 0 to $720*2^{16}$, inclusive. static_ver_range shall be in the range of 0 to $180*2^{16}$, inclusive. When both static_hor_range and static_ver_range are equal to 0, the sphere region for each sample referring to this sample entry is a point on a spherical surface.

num_regions specifies the number of sphere regions in the samples referring to this sample entry. num_regions shall be equal to 1. Other values of num_regions are reserved.

In clause 7.4.3 of the OMAF specification, the sample definition, syntax, and semantics of the sphere region timed metadata track are specified as follows:

Each sample specifies a sphere region. The SphereRegionSample structure may be extended in derived track formats.

```
aligned(8) SphereRegionStruct(range_included_flag) {
        signed int(32) center_yaw;
        signed int(32) center_pitch;
```

```
        singed int(32) center_roll;
        if (range_included_flag) {
            unsigned int(32) hor_range;
            unsigned int(32) ver_range;
        }
        unsigned int(1) interpolate;
        bit(7) reserved = 0;
    }
    aligned(8) SphereRegionSample( ) {
        for (i = 0; i < num_regions; i++)
            SphereRegionStruct(dynamic_range_flag)
    }
```

When SphereRegionStruct( ) is included in the SphereRegionSample( ) structure, the following applies:

center_yaw, center_pitch, and center_roll specify the viewport orientation in units of $2^{-16}$ degrees relative to the global coordinate axes. center_yaw and center_pitch indicate the center of the viewport, and center_roll indicates the roll angle of the viewport. center_yaw shall be in the range of $-180*2^{16}$ to $180*2^{16}-1$, inclusive. center_pitch shall be in the range of $-90*2^{16}$ to $90*2^{16}$, inclusive. center_roll shall be in the range of $-180*2^{16}$ to $180*2^{16}-1$, inclusive.

hor_range and ver_range, when present, specify the horizontal and vertical ranges, respectively, of the sphere region specified by this sample in units of $2^{-16}$ degrees. hor_range and ver_range specify the range through the center point of the sphere region, as illustrated by FIG. 3 or FIG. 4. hor_range shall be in the range of 0 to $720*2^{16}$, inclusive. ver_range shall be in the range of 0 to $180*2^{16}$, inclusive.

The sphere region specified by this sample is derived as follows:
If both hor_range and ver_range are equal to 0, the sphere region specified by this sample is a point on a spherical surface.
Otherwise, the sphere region is defined using variables cYaw1, cYaw2, cPitch1, and cPitch2 derived as follows:

```
        cYaw1 = (center_yaw - (range_included_flag ?
hor_range : static_hor_range) ÷ 2) ÷65536
        cYaw2 = (center_yaw + (range_included_flag ?
hor_range : static_hor_range) ÷ 2) ÷65536
        cPitch1 = (center_pitch - (range_included_flag ?
ver_range : static_ver_range) ÷ 2) ÷65536
        cPitch2 = (center_pitch + (range_included_flag ?
ver_range : static_ver_range) ÷ 2) ÷65536
```

The sphere region is defined as follows:
When shape_type is equal to 0, the sphere region is specified by four great circles defined by four points cYaw1, cYaw2, cPitch1, cPitch2 and the center point defined by center_pitch and center_yaw and as shown in FIG. 3.
When shape_type is equal to 1, the sphere region is specified by two yaw circles and two pitch circles defined by four points cYaw1, cYaw2, cPitch1, cPitch2 and the center point defined by center_pitch and center_yaw and as shown in FIG. 4.
Let the target media samples be the media samples in the referenced media tracks with composition times greater than or equal to the composition time of this sample and less than the composition time of the next sample.
interpolate equal to 0 specifies that the values of center_yaw, center_pitch, center_roll, hor_range (if present), and ver_range (if present) in this sample apply to the target media samples. interpolate equal to 1 specifies that the values of center_yaw, center_pitch, center_roll, hor_range (if present), and ver_range (if present) that apply to the target media samples are linearly interpolated from the values of the corresponding fields in this sample and the previous sample.

The value of interpolate for a sync sample, the first sample of the track, and the first sample of a track fragment shall be equal to 0.

In clause 7.4.5 of the OMAF specification, the recommended viewport timed metadata track is specified as follows:

The recommended viewport timed metadata track indicates the viewport that should be displayed when the user does not have control of the viewing orientation or has released control of the viewing orientation.

NOTE: The recommended viewport timed metadata track may be used for indicating a director's cut.

The sample entry type 'rcvp' shall be used.
The sample syntax of SphereRegionSample shall be used.
shape_type shall be equal to 0 in the SphereRegionConfigBox of the sample entry.
static_hor_range and static_ver_range, when present, or hor_range and ver_range, when present, indicate the horizontal and vertical fields of view, respectively, of the recommended viewport.
center_yaw and center_pitch indicate the center point of the recommended viewport. center_roll indicates the roll angle of the recommended viewport.

Item 13 of MPEG document m40783 proposed the so-called most-viewed viewport regional metadata as described below in the context of OMAF:

The most-viewed viewport timed metadata track indicates, for each picture, the viewport that has been viewed the most.

The sample entry type 'mvvp' shall be used.
The sample syntax of RegionOnSphereSample shall be used.
shape_type shall be equal to 0 in the RegionOnSphereConfigBox of the sample entry.
static_hor_range and static_ver_range, when present, or hor_range and ver_range, when present, indicate the horizontal and vertical fields of view, respectively, of the most-viewed viewport.
center_yaw and center_pitch indicate the center point of the most-viewed viewport. center_roll indicates the roll angle of the most-viewed viewport.

In the MPEG document m40805 titled "Berlin OMAF AHG meeting agenda and minutes," it was noted that it was suggested to add some indication to the recommended viewport signaling that could be used to indicate the source and nature of the metadata, e.g., 1) per the director cut, 2) per the statistically most-viewed viewport, 3) by a particular person or user, and so on.

Video encoding specifications may be deficient in providing a description for signaling regional metadata in video bitstreams.

JCTVC-AA1005 (available at http://phenix.int-evry.fr/jct/doc_end_user/documents/27_Hobart/wg11/JCTVC-AA1005-v1.zip) specifies the omnidirectional viewport SEI message (in clauses D.2.42 and D.3.42 of JCTVC-AA1005). The syntax and semantics of that SEI message are as follows, where CLVS stands for coded layer video sequence:

Syntax

| | Descriptor |
|---|---|
| omni_viewport( payloadSize ) { | |
|   omni_viewport_id | u(10) |
|   omni_viewport_cancel_flag | u(1) |
|   if( !omni_viewport_cancel_flag) { | |
|     omni_viewport_persistence_flag | u(1) |
|     omni_viewport_cnt_minus1 | u(4) |
|     for( i = 0; i <= omni_viewport_cnt_minus1; i++ ) { | |
|       omni_viewport_yaw_center[ i ] | i(32) |
|       omni_viewport_pitch_center[ i ] | i(32) |
|       omni_viewport_roll_center[ i ] | i(32) |
|       omni_viewport_yaw_range[ i ] | u(32) |
|       omni_viewport_pitch_range[ i ] | u(32) |
|     } | |
|   } | |
| } | |

Semantics

The omnidirectional viewport SEI message specifies the coordinates of one or more regions of spherical-coordinate geometry, bounded by four great circles, corresponding to viewports recommended for display. The reference spherical coordinate system used for the omnidirectional viewport SEI message is the same as for the omnidirectional projection indication SEI message with omni_projection_type equal to 0.

omni_viewport_id contains an identifying number that may be used to identify the purpose of the one or more recommended viewport regions.

Values of omni_viewport_id from 0 to 511, inclusive, may be used as determined by the application. Values of omni_viewport_id from 512 to 1023 are reserved for future use by ITU-T|ISO/IEC. Decoders encountering a value of omni_viewport_id in the range of 512 to 1023, inclusive, shall ignore it.

omni_viewport_cancel_flag equal to 1 indicates that the SEI message cancels the persistence of any previous omnidirectional viewport SEI message in output order. omni_viewport_cancel_flag equal to 0 indicates that omnidirectional viewport information follows.

omni_viewport_persistence_flag specifies the persistence of the omnidirectional viewport SEI message for the current layer.

omni_viewport_persistence_flag equal to 0 specifies that the omnidirectional viewport SEI message applies to the current decoded picture only.

Let picA be the current picture. omni_viewport_persistence_flag equal to 1 specifies that the omnidirectional viewport SEI message persists for the current layer in output order until one or more of the following conditions are true:
  A new CLVS of the current layer begins.
  The bitstream ends.
  A picture picB in the current layer in an access unit containing an omnidirectional viewport SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

When an omnidirectional projection indication SEI message with omni_projection_information_cancel_flag equal to 0 is not present in the CLVS that applies to the current picture and precedes the omnidirectional viewport SEI message in decoding order, an omnidirectional viewport SEI message with omni_viewport_cancel_flag equal to 0 shall not be present in the CLVS that applies to the current picture. Decoders shall ignore omnidirectional viewport SEI messages with omni_viewport_cancel_flag equal to 0 that do not follow, in decoding order, an omnidirectional projection indication SEI message with omni_projection_information_cancel_flag equal to 0 in the CLVS that applies to the current picture.

omni_viewport_cnt_minus1 specifies the number of recommended viewport regions that are indicated by the SEI message.

omni_viewport_yaw_center[i] indicates the center of the i-th recommended viewport region, around the up vector, in units of $2^{-16}$ degrees. The value of omni_viewport_yaw_center[i] shall be in the range of $-180*2^{16}$ (i.e., −11796480) to $180*2^{16}-1$ (i.e., 11796479), inclusive.

omni_viewport_pitch_center[i] indicates the center of the i-th recommended viewport region, around the omni_viewport_yaw_center, i.e., the right vector after yaw rotation, in units of $2^{-16}$ degrees. The value of omni_viewport_pitch_center[i] shall be in the range of $-90*2^{16}$ (i.e., −5898240) to $90*2^{16}$ (i.e., 5898240), inclusive.

omni_viewport_roll_center[i] indicates the center of the i-th recommended viewport region, around the omni_viewport_pitch_center, i.e., the forward vector after yaw and pitch rotation, in units of $2^{-16}$ degrees. The value of omni_viewport_roll_center[i] shall be in the range of $-180*2^{16}$ (i.e., −11796480) to $2^{16}-1$ (i.e., 11796479), inclusive.

omni_viewport_yaw_range[i] indicates the size of the i-th recommended viewport region of the projection mapped decoded picture in range of values of yaw in units of $2^{-16}$ degrees. The value of omni_viewport_yaw_range[i] shall be in the range of 1 to $360*2^{16}$ (i.e., 23592960), inclusive.

omni_viewport_pitch_range[i] indicates the size of the i-th recommended viewport region of the projection mapped decoded picture, in range of values of pitch in units of $2^{-16}$ degrees. The value of omni_viewport_pitch_range[i] shall be in the range of 1 to $180*2^{16}$ (i.e., 11796480), inclusive.

Regional metadata, as described above, can enable a content creator to specify regions of interest in a 360-degree or omnidirectional video. A region of interest, can be a portion of the 360-degree video that the content creator wants to highlight for one reason or another. For example, when the viewer is passively observing the video (e.g., the viewer does not control the portion of the video that is place in front of the viewer), the region of interest can be presented in the viewer's primary viewport (e.g., the viewport directly in front of the viewer. Herein, the terms "region of interest," "sphere region," and "recommended viewport" are used interchangeably.

Various specifications that describe how 360-degree video can be recorded lack for a specification for signaling the regional metadata of an omnidirectional video. For example, there is no well-defined and accepted specification in either container file formats or video bitstream encoding specifications for signaling of a source and nature of a sphere region (e.g., a description of the sphere region, possibly including why the sphere region is a region of interest) or the recommended viewport timed metadata. As another example, when each sample specifies more than one sphere region (e.g., each sphere region is a recommended viewport), between any two of the sphere regions it is unknown which one is relatively more important or more recommended than the other. As another example, the source and nature of a recommended viewport can include many sources and descriptions, above and beyond that the recommended viewport is the director's cut or the statistically most-viewed. For example, the recommended viewport may have been specified by a celebrity or a particular website, may be significant in a particular context, and/or may be recommended for other reasons. In this example, precisely specifying the source and nature of a recommended viewport may be burdensome and may not be necessary, and a simple approach for signaling a source and nature other than a director's cut or statistically most-viewed should be adopted.

Systems and methods are provided for specifying regional information such as a source and nature of a recommend viewport and a priority among multiple recommended viewports. Some or all of the methods may be applied independently and some or all of the methods may be applied in combination.

As a first example, a specification can be provided for signaling the source and nature associated with a recommended viewport and the recommended viewport timed metadata, which can be applied to container files and/or video bitstreams. In this example, the specification can include, in the SphereRegionConfigBox syntax that is described above, adding a loop of fields, one for each sphere region (e.g., specified by the samples to which the sample entry applies) to indicate a source of the sphere region. In the context of recommended viewport (e.g., when the sample entry type is 'rcvp'), the value of this field may indicate director's cut (e.g., when the value is equal to 0), most-viewed by statistics (e.g., when the value is equal to 1), or another source and nature. In some examples, the value of the num_regions field in the SphereRegionConfigBox is allowed to be greater than 1. In such examples, different sphere regions can be carried in the same timed metadata track. In some examples, the value of the num_regions field may still be required to be equal to 1. In these examples, different sphere regions would be carried in different timed metadata tracks.

Alternatively or additionally, in the first example, a field can be added to the omnidirectional viewport SEI message syntax, one for each viewport, to indicate a source and nature of the viewport. The value of this field may indicate director's cut (e.g., when the value is equal to 0), most-viewed by statistics (e.g., when the value is equal to 1), or another source and nature.

As a second example, a specification can be provided to specify which of multiple sphere regions is more important than the others. In this example, the specification can include, in the SphereRegionConfigBox syntax, adding a loop of fields, one for each sphere region (e.g., specified by the samples to which the sample entry applies) to indicate a priority of the sphere region. In the context of recommended viewport (i.e., when the sample entry type is 'rcvp'), as an example, a lower priority value for a viewport indicates a higher degree of recommendation for the viewport. For example, in some cases, the viewport with a priority value 0 is the most recommended viewport.

Alternatively or additionally, in the second example, a field can be added to the omnidirectional viewport SEI message syntax, one for each viewport, to indicate a priority of the viewport. As an example, a lower priority value for a viewport can indicate a higher recommendation for the viewport. for example, in some cases, the viewport with a priority value 0 is the most recommended viewport.

As a third example, a specification can be provided to indicate a reason for a recommended viewport (e.g., a source and nature other than the viewport being a director's cut or a statistically most-viewed viewport). In this example, the specification can include, in the SphereRegionConfigBox syntax, adding a loop of fields (which can be referred to as a source field) for each sphere region, as described in the first example above, to indicate a source of the sphere region. In this example, when a source field is a particular value (e.g., two) another filed can be added to the SphereRegionConfigBox to indicate a universal resource identifier (URI). In this example, the URI can provide a unique name of the method used to generate the sphere region information.

Alternatively or additionally, in the third example, a field can be added to the omnidirectional viewport SEI message syntax, when the value of the source field is equal to a particular value (e.g., two). In this example, the additional field can indicate a URI that provides the URI of the description of the method used to generate the viewport information.

In some cases, alternatively to or in combination with the first, second, and third examples discussed above, in a fourth example, a specification can be provided that defines a new SEI message (e.g., named omnidirectional CLVS viewport SEI message or another suitable name). In this example, the new SEI message can signal the information for a recommended viewport, and this information can static over an entire coded layer video sequence (CLVS). In some examples, the information that is signalled as described in the first, second, and third examples above can instead be signalled in the new SEI message. In addition, in some examples, the omni_viewport_id syntax element may be removed from the omnidirectional viewport SEI message. Furthermore, in some cases, the omni_viewport_cnt_minus1 syntax element may be signaled in both the omnidirectional viewport SEI message and the new SEI message (with a different syntax element name in the new SEI message). Compared to the case where omni_viewport_cnt_minus1 syntax element is signalled only in the new SEI message, this avoids syntax parsing dependency of the omnidirectional viewport SEI message on the new SEI message. This way, most of the static information does not needed to be repeated in the omnidirectional viewport SEI messages that carry dynamic position and size of each sphere region across pictures in a CLVS.

In some cases, alternatively to or in combination with the first, second, and third examples discussed above, in a fifth, example, a specification can be provided for signaling a recommended viewport in OMAF. In this example, instead of changing the syntax of SphereRegionConfigBox, a new box is defined to contain the same information, and the new box is directly included into the same entry syntax when the sample entry type is 'rcvp'.

Example embodiments for the fourth and fifth examples discussed above are now provided. These embodiments are provided only as example implementations for these examples, and other implementations are possible.

Example Embodiment of the Fourth Example

An illustrative detailed embodiment for fourth example described above is provided for illustrative purposes.

The syntax and semantics of the new SEI message, named omnidirectional CLVS viewport SEI message in this example, are as follows:

Syntax

|  | Descriptor |
|---|---|
| omni_clvs_viewport( payloadSize ) { | |
|   ocv_reserved_zero_4bits | u(4) |
|   omni_clvs_viewport_cnt_minus1 | u(4) |
|   for( i = 0; i <= omni_clvs_viewport_cnt_minus1; i++ ) { | |
|     omni_clvs_viewport_priority[ i ] | u(8) |
|     omni_clvs_viewport_source[ i ] | u(8) |
|     if(omni_clvs_viewport_source[ i ] = = 2 ) { | |
|       ViewportGeneratingUriIdx[ i ] = 0 | |
|       do | |
|         viewport_generating_uri[ i ] | b(8) |
|         [ ViewportGeneratingUriIdx ] | |
|       while( viewport_generating_uri[ i ] | |
| [ ViewportGeneratingUriIdx++ ] != 0 ) | |
|     } | |
|   } | |
| } | |

Semantics

The omnidirectional CLVS viewport SEI message specifies information that applies to all viewports specified by the omnidirectional viewport SEI messages in the CLVS.

When an omnidirectional projection indication SEI message with omni_projection_information_cancel_flag equal to 0 is not present in the CLVS that applies to the current picture and precedes the omnidirectional CLVS viewport SEI message in decoding order, an omnidirectional CLVS viewport SEI message shall not be present in the CLVS that applies to the current picture. Decoders shall ignore omnidirectional CLVS viewport SEI messages that do not follow, in decoding order, an omnidirectional projection indication SEI message with omni_projection_information_cancel_flag equal to 0 in the CLVS that applies to the current picture.

Let the current omnidirectional projection indication SEI message be the omnidirectional projection indication SEI message with omni_projection_information_cancel_flag equal to 0 in the CLVS that applies to the current picture. The information in an omnidirectional CLVS viewport SEI message persists from the current picture until the last picture in the CLVS, in decoding order, to which the current omnidirectional projection indication SEI message applies.

ocv_reserved_zero_4 bits shall be equal to 0 in bitstreams conforming to this version of this Specification. Other values for ocv_reserved_zero_4 bits are reserved for future use by ITU-T|ISO/IEC. Decoders shall ignore the value of ocv_reserved_zero_4 bits.

omni_clvs_viewport_cnt_minus1 plus 1 specifies the number of recommended viewport regions that are indicated by the omnidirectional CLVS viewport SEI message and the associated omnidirectional viewport SEI messages. The associated omnidirectional viewport SEI messages of an omnidirectional CLVS viewport SEI message are the omnidirectional viewport SEI messages with omni_viewport_cancel_flag equal to 0 that apply to the same set of pictures of the CLVS to which the omnidirectional CLVS viewport SEI message applies.

omni_clvs_viewport_priority[i] indicates the priority of the i-th viewport region specified by this SEI message and the associated omnidirectional viewport SEI messages. A lower value of omni_clvs_viewport_priority[i] indicates a higher recommendation for the viewport. The viewport with a priority value 0 is the most recommended viewport.

omni_clvs_viewport_source[i] specifies the source of the i-th viewport region specified by this SEI message and the associated omnidirectional viewport SEI messages as in the following table:

Table of omni_clvs_viewport_source[i] values

| Value | Description |
|---|---|
| 0 | A viewport per the director's cut |
| 1 | A viewport per the most-viewed viewport by statistics |
| 2 | A viewport per a method indicated by a URI |
| 3-255 | Reserved |

The value of omni_clvs_viewport_source[i] shall be in the range of 0 to 2, inclusive, in bitstreams conforming to this version of this Specification. Other values for omni_clvs_viewport_source[i] are reserved for future use by ITU-T|ISO/IEC. Decoders shall allow the value of omni_clvs_viewport_source[i] greater than or equal to 3 to appear in the syntax and shall ignore the value of omni_clvs_viewport_source[i] greater than or equal to 3.

viewport_generating_uri[i][ViewportGeneratingUriIdx] is the ViewportGeneratingUriIdx-th byte of a null-terminated string encoded in UTF-8 characters, specifying the universal resource identifier (URI) of the description of the method used to generate the i-th viewport region specified by this SEI message and the associated omnidirectional viewport SEI messages.

The syntax and semantics of the omnidirectional viewport SEI message are changed as follows (where addition to the syntax and semantics are indicated in between "<insert>" and "<insertend>" symbols (e.g., "<insert>added text<insertend>") and deletions are shown in between "<delete>" and "<deleteend>" symbols (e.g., "<delete>deleted text<deleteend>")):

|  | Descriptor |
|---|---|
| omni_viewport( payloadSize ) { | |
| <delete>omni_viewport_id<deleteend> | <delete>u(10)<deleteend> |
|   omni_viewport_cancel_flag | u(1) |
|   if( !omni_viewport_cancel_flag ) { | |
|     omni_viewport_persistence_flag | u(1) |
|     <insert>ov_reserved_zero_2bits<insertend> | <insert>u(2)<insertend> |
|     omni_viewport_cnt_minus1 | u(4) |
|     for( i = 0; i <= omni_viewport_cnt_minus1; i++) { | |
|       omni_viewport_yaw_center[ i ] | i(32) |
|       omni_viewport_pitch_center[ i ] | i(32) |
|       omni_viewport_roll_center[ i ] | i(32) |
|       omni_viewport_yaw_range[ i ] | u(32) |
|       omni_viewport_pitch_range[ i ] | u(32) |
|     } | |
|   } | |
| } | |

The omnidirectional viewport SEI message specifies the coordinates of one or more regions of spherical-coordinate geometry, bounded by four great circles, corresponding to viewports recommended for display. The reference spherical coordinate system used for the omnidirectional viewport SEI message is the same as for the omnidirectional projection indication SEI message with omni_projection_type equal to 0.

<delete>omni_viewport_id contains an identifying number that may be used to identify the purpose of the one or more recommended viewport regions.

Values of omni_viewport_id from 0 to 511, inclusive, may be used as determined by the application. Values of omni_viewport_id from 512 to 1023 are reserved for future use by ITU-T|ISO/IEC. Decoders encountering a value of omni_viewport_id in the range of 512 to 1023, inclusive, shall ignore it.<deleteend> omni_viewport_cancel_flag equal to 1 indicates that the SEI message cancels the persistence of any previous omnidirectional viewport SEI message in output order. omni_viewport_cancel_flag equal to 0 indicates that omnidirectional viewport information follows.

omni_viewport_persistence_flag specifies the persistence of the omnidirectional viewport SEI message for the current layer.

omni_viewport_persistence_flag equal to 0 specifies that the omnidirectional viewport SEI message applies to the current decoded picture only.

Let picA be the current picture. omni_viewport_persistence_flag equal to 1 specifies that the omnidirectional viewport SEI message persists for the current layer in output order until one or more of the following conditions are true:

A new CLVS of the current layer begins.
The bitstream ends.
A picture picB in the current layer in an access unit containing an omnidirectional viewport SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

<insert>When an omnidirectional CLVS viewport SEI message is not present in the CLVS that applies to the current picture and precedes the omnidirectional viewport SEI message in decoding order, an omnidirectional viewport SEI message with omni_viewport_cancel_flag equal to 0 shall not be present in the CLVS that applies to the current picture. Decoders shall ignore omnidirectional viewport SEI messages with omni_viewport_cancel_flag equal to 0 that do not follow, in decoding order, an omnidirectional CLVS viewport SEI message in the CLVS that applies to the current picture.<insertend>

<delete>When an omnidirectional projection indication SEI message with omni_projection_information_cancel_flag equal to 0 is not present in the CLVS that applies to the current picture and precedes the omnidirectional viewport SEI message in decoding order, an omnidirectional viewport SEI message with omni_viewport_cancel_flag equal to 0 shall not be present in the CLVS that applies to the current picture. Decoders shall ignore omnidirectional viewport SEI messages with omni_viewport_cancel_flag equal to 0 that do not follow, in decoding order, an omnidirectional projection indication SEI message with omni_projection_information_cancel_flag equal to 0 in the CLVS that applies to the current picture. <deleteend>

<insert>ov_reserved_zero_2 bits shall be equal to 0 in bitstreams conforming to this version of this Specification. Other values for ov_reserved_zero_2bits are reserved for future use by ITU-T|ISO/IEC. Decoders shall ignore the value of ov_reserved_zero_2bits. <insertend> omni_viewport_cnt_minus1 <insert>plus 1<insertend> specifies the number of recommended viewport regions that are indicated by the SEI message. <insert>The value of omni_viewport_cnt_minus1 shall be equal to omni_clvs_viewport_cnt_minus1 of the omnidirectional CLVS viewport SEI message in the CLVS. <insertend>

Example Embodiment for the Fifth Example

An illustrative detailed embodiment for the fifth example described above is provided for illustrative purposes.

The semantics of OMAF are changed as follows (where addition to the syntax and semantics are indicated in between "<insert>" and "<insertend>" symbols (e.g., "<insert>added text<insertend>") and deletions are shown in between "<delete>" and "<deleteend>" symbols (e.g., "<delete>deleted text<deleteend>")):

num_regions specifies the number of sphere regions in the samples referring to this sample entry. <delete>num_regions shall be equal to 1. Other values of num_regions are reseved.<deleteend>

The definition of the recommended viewport in clause 7.4.5 of the latest OMAF draft spec is changed as follows (where yellow highlights are additions and strikethroughs in red fonts are removals, other parts remain unchanged):

The recommended viewport timed metadata track indicates the viewport that should be displayed when the user does not have control of the viewing orientation or has released control of the viewing orientation.

NOTE: The recommended viewport timed metadata track may be used for indicating a director's cut<insert>, a most-viewed viewport by statistics, or generated by other means specified by a URI<insertend>.

The sample entry type 'rcvp' shall be used.
<insert>The sample entry of this sample entry type is specified as follows:

```
class RcvpSampleEntry( ) extends
SphereRegionSampleEntry('rcvp'){
        RecommendedViewportInfoBox( ); // mandatory
}
class RecommendedViewportInfoBox extends FullBox('rvif',
version = 0, flags) {
   for (i = 0; i < num_regions; i++) {
            unsigned int(8) region_priority[i];
            unsigned int(8) region_source[i];
            if (region_source[i] == 2)
               string region_generating_uri[i];
   }
}
``` region_priority[i] indicates the priority of the i-th recommended viewport. A lower value indicates a higher recommendation for the recommended viewport. The recommended viewport with a value 0 of region_priority[i] is the most recommended.

region_source[i] specifies the source of the i-th recommended viewport as in the following table:

Table of region_source[i] values

| Value | Description |
|---|---|
| 0 | A recommended viewport per the director's cut |
| 1 | A recommended viewport per the most-viewed viewport by statistics |
| 2 | A recommended viewport per a method indicated by a URI |
| 3-255 | Reserved | region_generating_uri[i] provides the URI of the description of the method used to generate the i-th recommended viewport. <insertend>

The sample syntax of SphereRegionSample shall be used.
shape_type shall be equal to 0 in the SphereRegionConfigBox of the sample entry.
static_hor_range and static_ver_range, when present, or hor_range and ver_range, when present, indicate the horizontal and vertical fields of view, respectively, of the recommended viewport.
center_yaw and center_pitch indicate the center point of the recommended viewport. center_roll indicates the roll angle of the recommended viewport.

Figure 5:
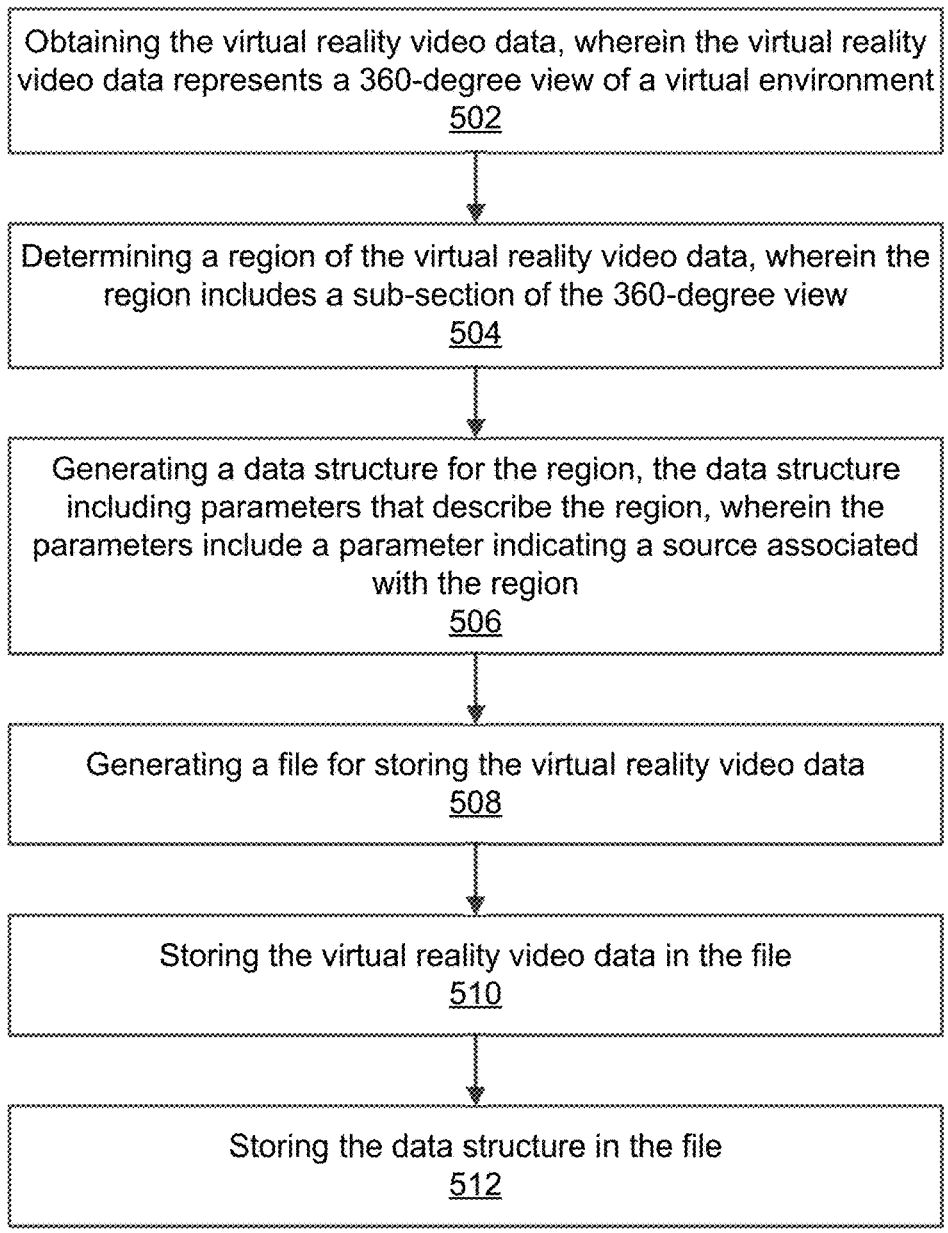
FIG. 5 is a flow chart illustrating an example of a process for processing virtual reality video data.

FIG. 5 is a flow chart illustrating an example of a process 500 for processing virtual reality video data. The example process 500 can be implemented by a video coding system, such as the system illustrated in FIG. 1.

Figure 6:
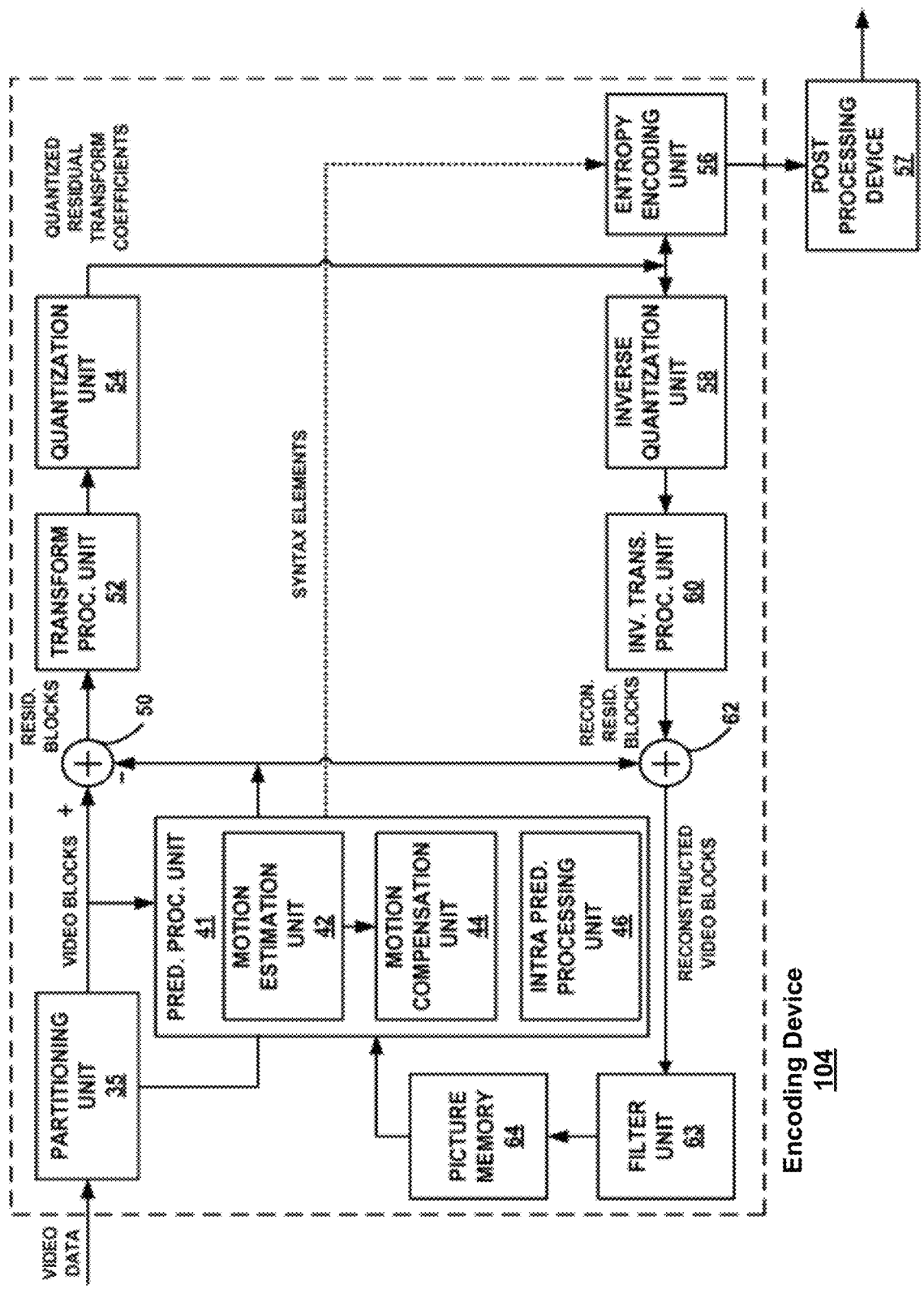
FIG. 6 is a block diagram illustrating an example encoding device.

At step 502, the process 500 of FIG. 6 includes obtaining the virtual reality video data, wherein the virtual reality video data represents a 360-degree view of a virtual environment. In some examples, video frames in the virtual reality video data can be represented as a spherical in shape, so that each video frame can include a full 360-degrees of data. In some examples, the virtual reality video data can be mapped to two-dimensional, rectangular formats, which can be more easily processed by systems configured to process two-dimensional video data.

At step 504, the process 500 includes determining a region of the virtual reality video data, wherein the region includes a sub-section of the 360-degree view. In some examples, the region can be used as a viewport when viewing the virtual reality video data.

In some examples, the region can be specified using four great circles. In this context, a great circle is a line drawn around the spherical representation of the virtual reality video data, where the line encompasses the circumference of the sphere. To specify a region, a first and a second of line can intersect at two points and be equidistant at all points between the points of intersection, such that an area between the first line and the second line can be included in the region. A third and fourth line can be used to further delineate the region. The third and fourth line can also intersect at two points and be equidistant at all points between the points of intersection. The third and fourth line can be oriented such that an area between the third and fourth line overlaps with the area between the first and the second line. The overlapping area can thus form the region. For example, the first and second lines and the third and fourth lines can overlap where the first and second lines are farthest apart from each other and the third and fourth lines are farthest apart from each other, such that the overlapping area is approximately rectangular in shape. Stated another way, the points where the first and second line intersect can be at 90 degrees from where the third and fourth lines intersect, such that an area formed by the intersection of the four lines forms the region.

In some examples, the region can be specified using two yaw circles and two pitch circles. For example, given a first point on the spherical representation of the virtual reality video data and a second point at 180 degrees from the first point, the first yaw circle can circumscribe the sphere from the first point to the second point and back to the first point. The second yaw circle can also circumscribe the sphere at an offset (e.g., defined by a yaw value) from the first yaw circle, such that a space is formed between the first yaw circle and the second yaw circle. In this example, the first pitch circle can be drawn on the surface of the sphere with the first point as the center of the first pitch circle, where a pitch value can indicate an angle from the first point to the first pitch circle. The second pitch circle can be drawn on the surface of the sphere with the first point as the center of the first pitch circle and a larger pitch value. In this example, the area formed by the intersection of the two yaw circles and the two pitch circles can be the region.

At step 506, the process 500 includes generating a data structure for the region, the data structure including parameters that describe the region, wherein the parameters include a parameter indicating a source associated with the region. The data structure can be, for example, an object class specified using an object-oriented programming language. As another example, the data structure can be a structure defined using a programming language. As another example, the data structure can be a syntax data structure as used by video encoding standards.

In some cases, a decoder can treat the region in different ways based on a source the specified the region. In some examples, the source associated with the region is a content creator. In these examples, the display device may give priority to the region when, for example, the viewer does not have control over the viewport or relinquishes control of the viewport to the system. In some examples, the source associated with the region indicates that the region is a most viewed region of the virtual reality video data. For example, a display device can record a viewport most often viewed by viewers of the video data. This information can then be used to specify the most often viewed viewport as a region of interest.

At step 508, the process 500 includes generating a file for storing the virtual reality video data. The file can be used to store and/or transport the virtual reality data. In some examples, the file can further be processed by a video coding device to display the virtual reality video data.

At step 510, the process 500 includes storing the virtual reality video data in the file. for example, frames from the virtual reality video data can be written to the file. In some examples, the video frames may be mapped from a three-dimensional representation to a two-dimensional representation before being written to the file. In some examples, the video frames can be encoded before being written to the file.

At step 512, the process 500 includes storing the data structure in the file. For example, the data structure can be stored as metadata in the file, which can be read from the file and interpreted by a video display device.

In some examples, the file is a container file, which can be organized according to a format. For example, the container file can be formatted according to the ISOBMFF file format specification or another file format specification. In this and other examples, the data structure can be stored in a box structure described by the format. For example, the data structure can be stored in a media data box. In some examples, a number of regions value in the box structure is allowed to be greater than one. In these examples, when the virtual reality video data includes more than one region, parameters for the multiple regions can be stored in a same timed metadata track. In some examples, a number of regions value in the box structure is constrained to one. In these examples, when the virtual reality video data includes more than one region, parameters for the more than one region are stored in different timed metadata tracks.

In some examples, the virtual reality video data is stored in the file as an encoded bitstream. In these examples, the data structure can be stored in a message element of the encoded bitstream, such as an SEI message.

Figure 7:
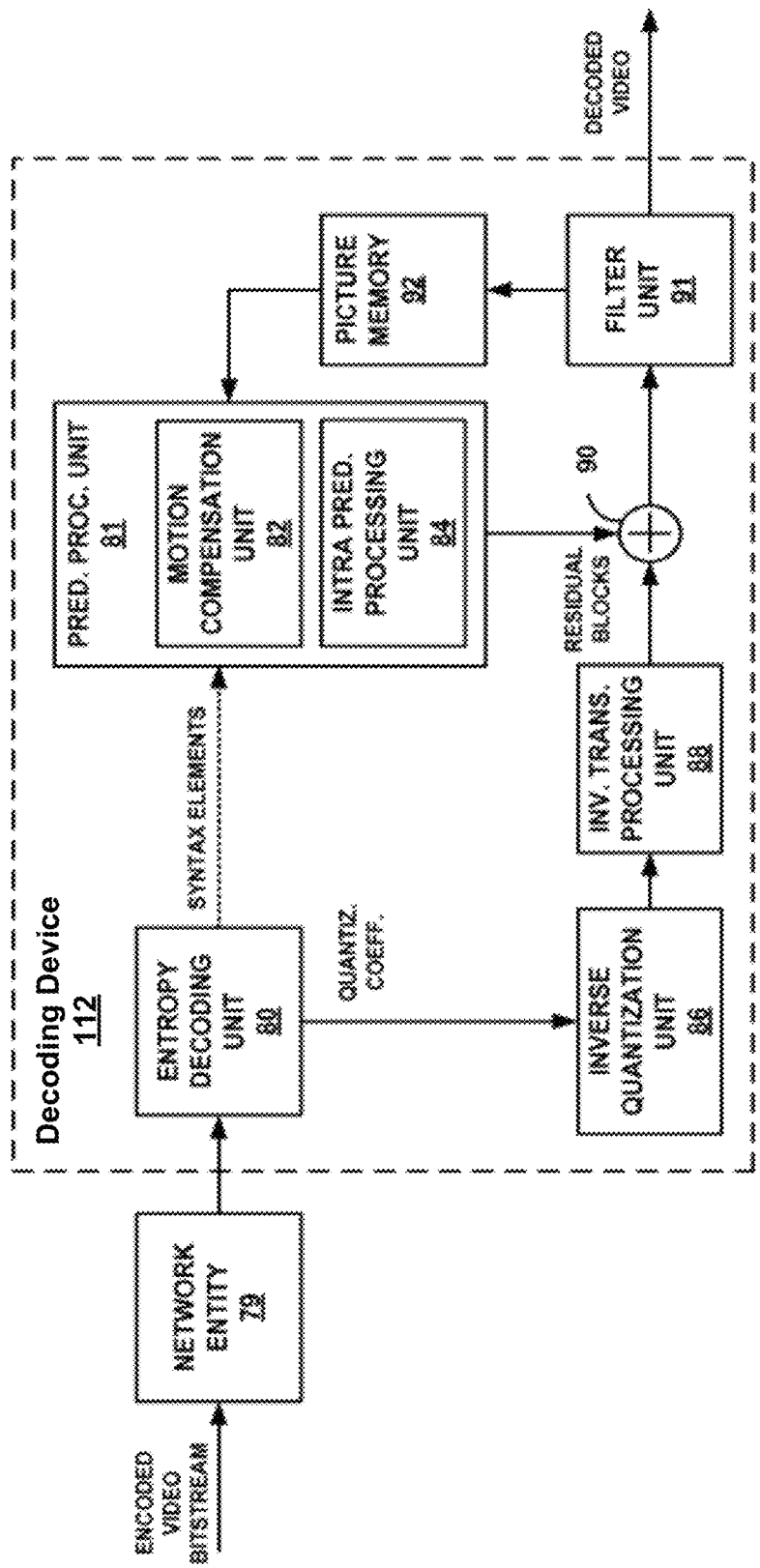
FIG. 7 is a block diagram illustrating an example decoding device.

Specific details of the encoding device 104 and the decoding device 112 are shown in FIG. 6 and FIG. 7, respectively. FIG. 6 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter. A post processing device 57 may perform additional processing on encoded video data generated by encoding device 104. The techniques of this disclosure may in some instances be implemented by encoding device 104. In other instances, however, one or more of the techniques of this disclosure may be implemented by post processing device 57.

As shown in FIG. 6, encoding device 104 receives video data, and partitioning unit 35 partitions the data into video blocks. The partitioning may also include partitioning into slices, slice segments, tiles, or other larger units, as well as video block partitioning, e.g., according to a quadtree structure of LCUs and CUs. Encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 104 may calculate values for sub-integer pixel positions of reference pictures stored in picture memory 64. For example, encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 112, or archived for later transmission or retrieval by decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 104 of FIG. 6 represents an example of a video encoder configured to generate syntax for a encoded video bitstream. Encoding device 104 may, for example, generate VPS, SPS, and PPS parameter sets as described above. The encoding device 104 may perform any of the techniques described herein, including the processes described above with respect to FIG. 6 and FIG. 7. The techniques of this disclosure have generally been described with respect to encoding device 104, but as mentioned above, some of the techniques of this disclosure may also be implemented by post processing device 57.

FIG. 7 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 112 may, in some examples, perform a decoding pass generally reciprocal to the encoding pass described with respect to encoding device 104 from FIG. 6.

During the decoding process, decoding device 112 receives an encoded video bitstream that represents video blocks of an encoded video slice and associated syntax elements sent by encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include encoding device 104. Some of the techniques described in this disclosure may be implemented by network entity 79 prior to network entity 79 transmitting the encoded video bitstream to decoding device 112. In some video decoding systems, network entity 79 and decoding device 112 may be parts of separate devices, while in other instances, the functionality described with respect to network entity 79 may be performed by the same device that comprises decoding device 112.

The entropy decoding unit 80 of decoding device 112 entropy decodes the bitstream to generate quantized coefficients, motion vectors, and other syntax elements. Entropy decoding unit 80 forwards the motion vectors and other syntax elements to prediction processing unit 81. Decoding device 112 may receive the syntax elements at the video slice level and/or the video block level. Entropy decoding unit 80 may process and parse both fixed-length syntax elements and variable-length syntax elements in one or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 104 during encoding of the video blocks to calculate interpolated values for sub-integer pixels of reference blocks. In this case, motion compensation unit 82 may determine the interpolation filters used by encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to a destination device via a computer-readable medium. The video source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from a source device to a destination device. In one example, a computer-readable medium may comprise a communication medium to enable a source device to transmit encoded video data directly to a destination device in real-time. The encoded video data may be modulated according to a communication standard, such as a wireless communication protocol, and transmitted to a destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source devices and destination devices are merely examples of such coding devices in which a source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if a video source is a video camera, a source device and a destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

What is claimed is:

1. A method of processing virtual reality video data, comprising:
obtaining the virtual reality video data, wherein the virtual reality video data represents a 360-degree view of a virtual environment;
determining a plurality of regions of the virtual reality video data, wherein a first region of the plurality of regions includes a first sub-section of the 360-degree view and a second region of the plurality of regions includes a second sub-section of the 360-degree view;
generating, for the plurality of regions, a data structure including parameters that describe the plurality of regions, wherein the parameters include a first parameter indicating a source associated with the first region of the plurality of regions and a second parameter indicating a source associated with the second region of the plurality of regions, a first numerical value for the first parameter indicating a first source for the first region of the plurality of regions and a second numerical value for the second parameter indicating a second source for the second region of the plurality of regions;
generating a file for storing the virtual reality video data;
storing the virtual reality video data in the file; and
storing the data structure in the file.

2. The method of claim 1, wherein the first region and the second region are configured to be used as viewports when the virtual reality video data is viewed.

3. The method of claim 1, wherein the file is a container file, wherein the container file is organized according to a format, and wherein the data structure is stored in a box structure described by the format.

4. The method of claim 3, wherein a number of regions in the box structure is allowed to be greater than one, and wherein, when the virtual reality video data includes more than one region, parameters for the region and the more than one region can be stored in a same timed metadata track.

5. The method of claim 3, wherein a number of regions in the box structure is constrained to one, and wherein, when the virtual reality video data includes more than one region, parameters for the more than one region are stored in different timed metadata tracks.

6. The method of claim 1, wherein the virtual reality video data is stored in the file as an encoded bitstream, and wherein the data structure is stored in a message element of the encoded bitstream.

7. The method of claim 1, wherein at least one of the first source or the second source is a content creator.

8. The method of claim 1, wherein at least one of the first numerical value or the second numerical value is a most viewed region of the virtual reality video data.

9. An apparatus for processing virtual reality video data, comprising:
a memory configured to store video data; and
a processor configured to:
obtain the virtual reality video data, wherein the virtual reality video data represents a 360-degree view of a virtual environment;
determine a plurality of regions of the virtual reality video data, wherein a first region of the plurality of regions includes a first sub-section of the 360-degree view and a second region of the plurality of regions includes a second sub-section of the 360-degree view;
generate, for the plurality of regions, a data structure including parameters that describe the plurality of regions, wherein the parameters include a first parameter indicating a source associated with the first region of the plurality of regions and a second parameter indicating a source associated with the second region of the plurality of regions, a first numerical value for the first parameter indicating a first source for the first region of the plurality of regions and a second numerical value for the second parameter indicating a second source for the second region of the plurality of regions;
generate a file for storing the virtual reality video data;
store the virtual reality video data in the file; and
store the data structure in the file.

10. The apparatus of claim 9, wherein the first region and the second region are configured to be used as a viewports when the virtual reality video data is viewed.

11. The apparatus of claim 9, wherein the file is a container file, wherein the container file is organized according to a format, and wherein the data structure is stored in a box structure described by the format.

12. The apparatus of claim 11, wherein a number of regions in the box structure is allowed to be greater than one, and wherein, when the virtual reality video data includes more than one region, parameters for the region and the more than one region can be stored in a same timed metadata track.

13. The apparatus of claim 11, wherein a number of regions in the box structure is constrained to one, and wherein, when the virtual reality video data includes more than one region, parameters for the more than one region are stored in different timed metadata tracks.

14. The apparatus of claim 9, wherein the virtual reality video data is stored in the file as an encoded bitstream, and wherein the data structure is stored in a message element of the encoded bitstream.

15. The apparatus of claim 9, wherein at least one of the first source or the second source is a content creator.

16. The apparatus of claim 9, wherein at least one of the first numerical value or the second numerical value indicates that the region is a most viewed region of the virtual reality video data.

17. A non-transitory computer-readable medium having stored thereon instructions that, when executed by a processor, cause the processor to perform operations for processing virtual reality video data, the operations including:
   determining a plurality of regions of the virtual reality video data, wherein a first region of the plurality of regions includes a first sub-section of 360-degree view and a second region of the plurality of regions includes a second sub-section of the 360-degree view;
   generating, for the plurality of regions, a data structure including parameters that describe the plurality of regions, wherein the parameters include a first parameter indicating a source associated with the first region of the plurality of regions and a second parameter indicating a source associated with the second region of the plurality of regions, a first numerical value for the first parameter indicating a first source for the first region of the plurality of regions and a second numerical value for the second parameter indicating a second source for the second region of the plurality of regions;
   generating a file for storing the virtual reality video data;
   storing the virtual reality video data in the file; and
   storing the data structure in the file.

18. The non-transitory computer-readable medium of claim 17, wherein the first region and the second region are configured to be used as viewports when the virtual reality video data is viewed.

19. The non-transitory computer-readable medium of claim 17, wherein the file is a container file, wherein the container file is organized according to a format, and wherein the data structure is stored in a box structure described by the format.

20. The non-transitory computer-readable medium of claim 19, wherein a number of regions in the box structure is allowed to be greater than one, and wherein, when the virtual reality video data includes more than one region, parameters for the region and the more than one region can be stored in a same timed metadata track.

21. The non-transitory computer-readable medium of claim 19, wherein a number of regions in the box structure is constrained to one, and wherein, when the virtual reality video data includes more than one region, parameters for the more than one region are stored in different timed metadata tracks.

22. The non-transitory computer-readable medium of claim 17, wherein the virtual reality video data is stored in the file as an encoded bitstream, and wherein the data structure is stored in a message element of the encoded bitstream.

23. The non-transitory computer-readable medium of claim 17, wherein at least one of the first source or the second source is a content creator.

24. The non-transitory computer-readable medium of claim 17, wherein at least one of the first numerical value or the second numerical value is a most viewed region of the virtual reality video data.

* * * * *